United States Patent [19]

Radtke

[11] Patent Number: 4,508,162
[45] Date of Patent: Apr. 2, 1985

[54] DOUBLE FLOOR

[75] Inventor: Manfred Radtke, Margetschochheim, Fed. Rep. of Germany

[73] Assignee: Mero-Werke Dr.-Ing. Max Mengeringhausen GmbH & Co., Fed. Rep. of Germany

[21] Appl. No.: 418,193

[22] Filed: Sep. 15, 1982

[30] Foreign Application Priority Data

Sep. 19, 1981 [DE] Fed. Rep. of Germany ....... 3137410

[51] Int. Cl.³ .............................................. F24H 9/08
[52] U.S. Cl. ...................................... 165/56; 165/49; 237/69
[58] Field of Search ........................ 165/53, 54, 55, 56, 165/49; 237/69

[56] References Cited

U.S. PATENT DOCUMENTS

| 1,771,269 | 7/1930 | Musgrave et al. | 165/56 |
| 1,800,150 | 4/1931 | Musgrave et al. | 165/56 |
| 2,729,431 | 1/1956 | Little | 165/56 |
| 2,800,308 | 7/1957 | Parkinson et al. | 165/56 |
| 2,843,363 | 7/1958 | Mailandel | 165/56 X |

FOREIGN PATENT DOCUMENTS

| 2136137 | 2/1973 | Fed. Rep. of Germany | 237/69 |
| 2515708 | 10/1976 | Fed. Rep. of Germany | 165/56 |
| 2535522 | 2/1977 | Fed. Rep. of Germany | 165/56 |
| 2918588 | 11/1980 | Fed. Rep. of Germany | 165/56 |
| 2930688 | 2/1981 | Fed. Rep. of Germany | 165/56 |
| 2302486 | 10/1976 | France | 165/53 |
| 155485 | 12/1920 | United Kingdom | 165/53 |
| 298069 | 10/1928 | United Kingdom | 165/53 |
| 403899 | 1/1934 | United Kingdom | 165/53 |

Primary Examiner—Albert W. Davis, Jr.
Attorney, Agent, or Firm—Jacobi Siegel Presta Marzullo & Aronson

[57] ABSTRACT

A double floor with framed floor plates of heat-conductive and/or heat storage materials, particularly a mineral material such as anhydrite in a metal vat-shaped outer armature. A system of pipes carrying a heating or cooling medium is held in heat-conductive contact with the bottom surfaces of the framed floor plates.

12 Claims, 9 Drawing Figures

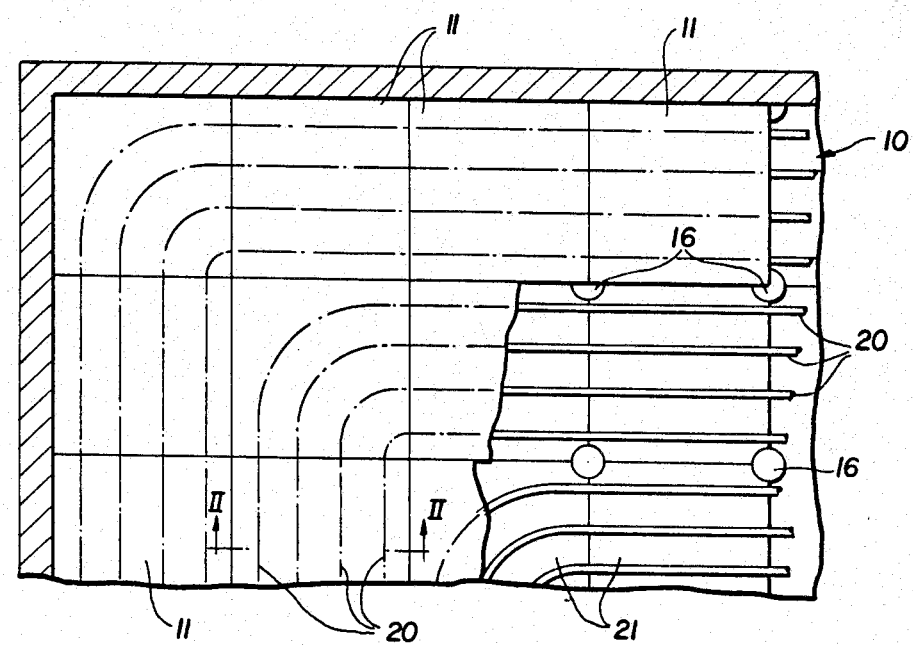
FIG.1
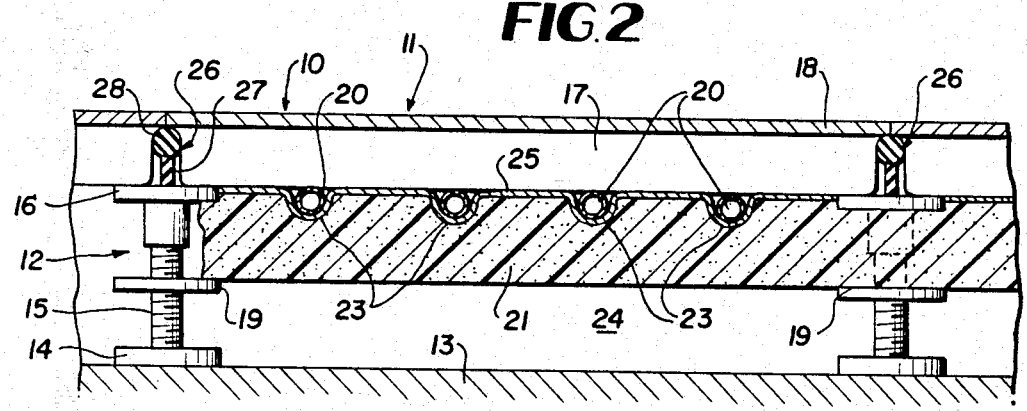
FIG.2
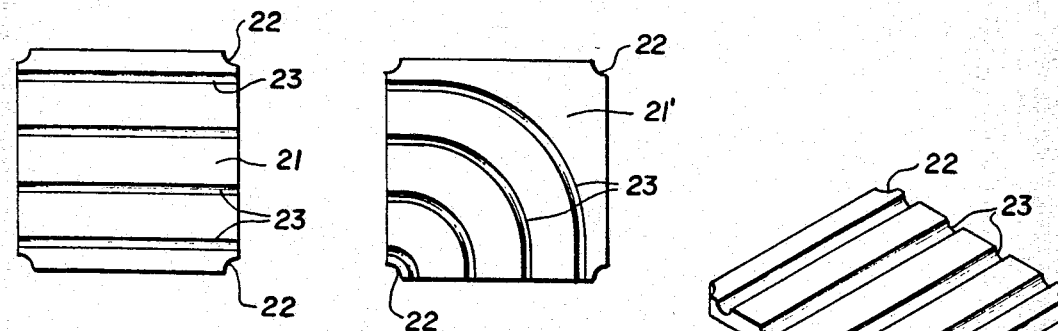
FIG.3  FIG.4
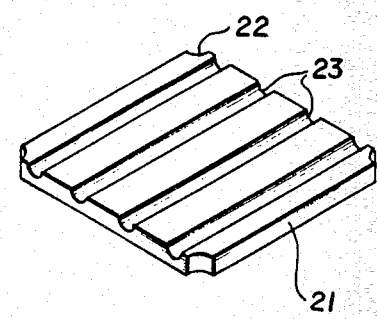
FIG.5

FIG.6
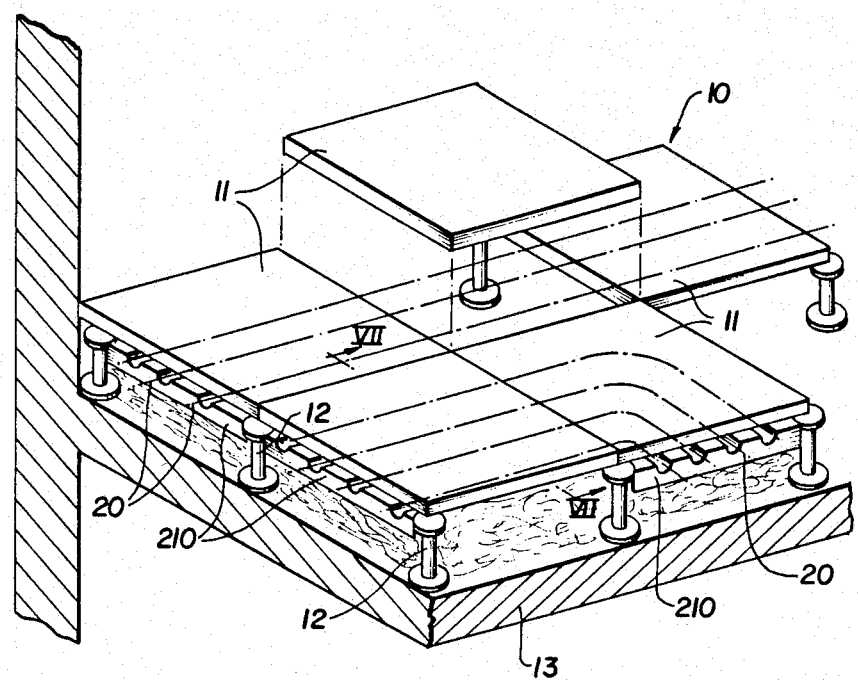
FIG.7
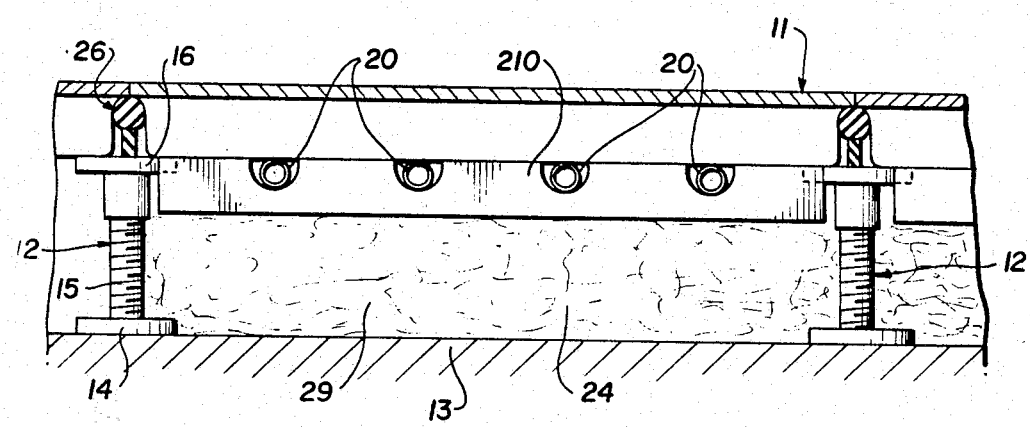
FIG.8
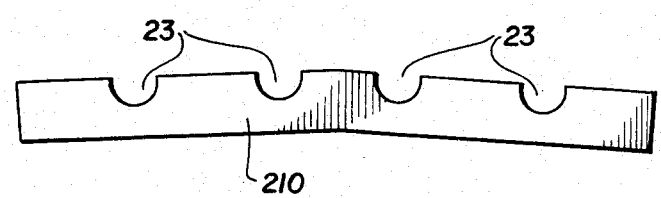
FIG.9

DOUBLE FLOOR

BACKGROUND OF THE INVENTION

The invention relates to a double floor with framed floor plates comprising heat conductive and/or heat storage materials, particularly double floors of mineral material, e.g., anhydrite, in a vat-shaped outer metal armature.

Double floors of the above type of construction are known in various embodiments and are used particularly to provide a hollow space beneath the floor plates for the laying of installation lines of different types and electrical cables. It is also known, for air conditioning and heating, to use the double floor hollow space to carry suitably conditioned or heated air. Further advantageous properties of these known double floors reside in that they can be assembled and disassembled remarkably simply and rapidly, and the hollow space remains accessible beneath the floor plates.

Heating and air conditioning of the room, however, for various reasons, cannot always be carried out advantageously. There exists, therefore, a need for a heatable (and coolable) double floor.

SUMMARY OF THE INVENTION

The object of the invention is to provide a double floor with floor plates of the above-described structural type as a heatable or coolable double floor, while maintaining all of the advantages of the double floor.

According to the invention, a system of pipes carrying a heating or cooling medium is held in heat-conductive contact with the bottom surfaces of the framed floor plates. Heat is thus transferred from the pipes to the floor plates by a sort of floor heating, whereby the heat flows in the floor plates both transversally and vertically, and the heated floor plates serve to heat the room, or in the case of the use of a cooling medium in the pipe system, they cool the room. Therefore, a more or less strong heat storage effect can be produced according to the configuration of the floor plates.

As opposed to the customary floor heating systems, the pipes which carry the mediums are rapidly and simply accessible in case of damage or breakdown, since for this purpose the framed floor plates need only be raised from their upright bearings. One more essential advantage of the invention resides in that loads on the double floor are carried on the individual floor plates and their upright bearings to the bottom of the building and therewith have almost no influence on the pipe system carrying the mediums. The appearance of sediments which are well known in customary floor heating systems, with uncontrollable resulting damage for the system of pipes carrying mediums, is thus avoided. The heat insulation of the pipe system underneath can furthermore be simple and low-cost, since no loads need to be carried by it.

If needed, supplementary changes could be made in the pipe system without further difficulty. The known advantages of a double floor are retained, i.e., a hollow space beneath the floor plates for the laying of electrical cable or installation lines of different types as well as rapid and simple assembly and disassembly of the entire double floor. A damaging sweat water formation due to the air circulation in such a hollow space is generally avoided. As opposed to the known floor heating systems by means of embedding the floor finish, the horizontal heat flow can also be limited remarkably simply, for example, in the edge area of the double floor, so that no heat losses occur, as in the current state of technology. The heat insulation of the pipe system underneath additionally brings a still further improved sound absorption in the double floor.

Various different structures can be used as floor plates, so long as they consist of materials with sufficient heat conductivity and/or heat storage capacity for the present purposes. One preferred floor plate for the purpose of the invention includes a heat storage mineral material, e.g., anhydrite in a good heat conductive vat-shaped outer armature e.g. of zinc-coated sheet steel. Practically any of the presently used materials could be used as floor coverings for the floor plates, including ceramic and flagstones.

For improvement of the heat transmission from the pipes to the floor plates, it is a good idea that the pipes be held in a known manner in laminar contact with the floor plates. For this purpose, the pipes could be leveled off by the finishing on the top or be leveled off by the weight of the floor plates, which presupposes the use of pipes of suitably deformable plastic. These measures to improve the heat transmission are already known from German DE-OS 3026416 for customary floor heating systems, but the degree of deformation of the pipe cross sections by the weight of the floor plates is not exactly determinable in this disclosure. On the other hand, the leveling off of the pipes by the weight of the floor plates can be adjusted precisely with the double floors according to the invention, e.g., in that the floor plates are mounted with their corners height-adjustable on supports.

According to still another embodiment of the invention, when the pipe system is supported by the upright bearings of the double floor, on which the floor plates are also mounted, a simpler construction and a simplified assembly are produced and at the same time the hollow space beneath the double floor is advantageously freed of the otherwise necessary additional support elements for the pipeline system.

Still another embodiment of the invention is characterized in that the pipes are held by holding anf fixation elements mounted on the upright bearings held against the floor plates, which are provided with holding grooves for the pipes and are configured rising away or curved away from their mounting positions against the bottom surfaces of the floor plates and consist of an elastically flexible material. Such holding and fixation elements improve the heat-conductive contact of the pipes with the bottom surfaces of the floor plates and therewith improve the desired heat transmission between these parts, and also they simplify the assembly of the pipe system. If the holding and fixation elements for the pipes are mounted on height-adjustable plates on the upright bearings, then the degree of leveling off of the pipes can be adjusted in a simple manner by the weight of the floor plates.

It is advantageous that the holding and fixation elements for the pipes can be formed of plate-shaped structural elements of a heat-insulating material. These structural elements are not costly to manufacture and they reduce heat losses.

The heat flow along the floor plates is further improved and heat losses are further reduced if the tops of the plate-shaped holding and fixation elements are provided with heat radiation reflecting sheets, foils or the like.

One particular version of the invention, still further limiting the heat losses, which also improves the sound insulation of the double floor, consists in that the holding and fixation elements for the pipes consist of bars and the sections of the pipe between these bars are held by an elastically flexible insulation material filling in the hollow space beneath the double floor parts against the floor plates, whereby the insulation material filling is compressed by the weight of the floor plates. Other installation lines or electric cables and so forth are also laid if needed beneath the insulation material filling.

The floor plates are packed in a known manner on their edges, to hold back rising warm air.

BRIEF DESCRIPTION OF THE DRAWINGS

The invention is described hereinafter relative to the drawings of exemplary embodiments.

They show:

FIG. 1 is a diagrammatic plan view of a part of a double floor according to the invention, partially without floor plates, in order to show the system of pipes and the plate-shaped structural elements thereunder, whereby the pipes are indicated simply by broken lines;

FIG. 2 is a sectional view taken substantially along line II—II of FIG. 1 in larger scale;

FIGS. 3 to 5 are plan and perspective views of plate-shaped structural elements, which are used as holding and fixation elements for the pipes in the double floor as in FIGS. 1 and 2;

FIG. 6 is a perspective view of a part of a double floor corresponding to a second embodiment of the invention, in which the pipes are again indicated only by broken lines and a floor plate is shown in a lifted position;

FIG. 7 is a sectional view taken substantially along line VII—VII of FIG. 6 in larger scale; and FIGS. 8 and 9 are front and side views, respectively, of a bar which is used as a holding and fixation element for the pipes in the embodiment shown in FIGS. 6 and 7.

DESCRIPTION OF THE PREFERRED EMBODIMENTS

The framed double floor 10 of both embodiments has supporting floor plates 11, which are mounted with their corners on upright bearings 12, which in turn are mounted and affixed on a subfloor 13 of a building. The upright bearings 12 each include a threaded pin 15, centered on a baseplate 14 onto which is screwed a holding plate 16, on which are mounted the floor plates 11 by their corners. Holding plates 16 are thus height-adjustable, in order to facilitate the leveling of floor plates 11.

Floor plates 11 consist essentially of an anhydrite filling in an outer metal vat-shaped armature 17, e.g., zinc-coated sheet steel and a floor covering 18 of, e.g., ceramic material, synthetic or natural stone or even plastic, including carpeting.

In the embodiment of FIGS. 1 and 2, more plates 19 are screwed onto threaded pins 15 of upright bearings 12, which consequently are also height-adjustable. On these plates 19 are mounted, by their corners, holding and fixation elements 21 and 21', as plate-shaped structural elements to support a system of pipes 20. These pipes 20 may be formed, e.g., of a plastic which is deformable under outside pressure and carry a heating and cooling medium for space heating or space cooling. For simplification of the description, reference is made hereinafter only to pipes 20 carrying a heating medium.

With the holding and fixation elements 21 and 21' configured as structural elements, they are of foamed or pressed plastic. These plate-shaped holding and fixation elements 21, 21' for pipes 20 are provided with curved recesses 22 on their corners, so that with installed holding and fixation elements 21 and 21', a hollow space for the fitting of an upright bearing 12 is defined by four such recesses 22. The plate-shaped holding and fixation elements 21, 21' are laid tightly, i.e., they engage with each other at the edges. On their tops, the plate-shaped holding and fixation elements 21 and 21' are provided with grooves 23 for pipes 20, of which the shape corresponds to that of pipes 20. Pipes 20 are inserted into these grooves before floor plates 11 are mounted on holding plates 16.

As shown in FIG. 2, the radius of this groove 23 is somewhat larger than the outside radius of pipe 20 and it is in any case notably less deep than the outside diameter of pipe 20, so that the pipe still rises over the top of the plate-shaped holding and fixation element 21, 21'.

With the assembly of double floor 10, the distance between the plate-shaped holding and fixation elements 21, 21' and floor plates 11 with reference to the outside diameter of pipes 20 is adjusted by suitable height-adjustment of plates 19, so that with the mounting of floor plates 11 on holding plates 16 of upright bearings 12, pipes 20 are somewhat pressed together under the weight of floor plates 11, and are somewhat leveled off, whereby they form a laminar heat-conductive contact with the bottom surfaces of floor plates 11, i.e., therefore with the bottom surfaces of the vat-shaped armatures 17 of zinc-coated sheet steel of these floor plates 11. Thereby, the heat transmission from pipes 20 to vat-shaped armatures 17 is improved, which aids the heat flow in the horizontal and vertical direction. The anhydrite filler of each floor plate 11 thus forms a heat storage in the desired manner. Plate-shaped holding and fixation elements 21, 21', formed of foamed or pressed plastic, define hollow space 24 and thus form a heat insulation in the double floor. The heat flow along floor plates 11 is still more improved in that the tops of plate-shaped holding and fixation elements 21, 21' are coated with a heat radiation reflecting layer 25, e.g., aluminum foil. In this manner, floor plates 11 heated by pipes 20 in turn direct the heat upwardly to the room. Desired installation lines and electrical cables (not shown) can be laid in the double floor hollow space 24.

It is important that plate-shaped holding and fixation elements 21, 21' are so configured that a permanent heat-conductive contact is assured between pipe 20 and the bottom surfaces of floor plates 11. For this purpose, it is advantageous that the plate-shaped holding and fixation elements be manufactured of a flexible plastic and/or have a top rising away from their mounting points against the floor plates' bottom surfaces, somewhat in the shape of a frustum. Thereby, they can be prestressed by the weight of floor plates 11 underneath, so that pipes 20 are held tightly by the elastic force of the plate-shaped holding and fixation elements 21 in a heat-conductive laminar contact with the bottom surfaces of floor plates 11.

Floor plates 11 are reciprocally packed on their edges to hold back rising warm air. In the embodiments, a profiled gasket 26 is provided for this purpose, which consists of a rigid support strip 27 and an elastic tube-like part 28, which is shaped, e.g., by fastening onto strip 27. The profiled gaskets 26 are mounted with their strips 27 on holding plates 16 of upright bearings 12. The tube-like part 28 when not loaded has a somewhat long oval shape and is deformed with the assembly of floor plates 11 by their weight, so that it engages tightly against the edges of floor plates 11, as shown in FIGS. 2 and 7.

In the embodiments of FIGS. 6 and 7, holding and fixation elements 210 consisting of rods are used for pipes 20 carrying a heat medium. These holding and fixation elements 210 are hollow rods of, e.g., angular zinc-coated sheet steel, curved upwardly, and they also have grooves 23 for pipes 20. These rod-shaped holding and fixation elements 210 are placed with their ends in slots on holding plates 16 and are mounted on them. Holding and fixation elements 210 which are thus mounted form a grating, which follows the upright joints of the laid floor plates 11. Pipes 20 are inserted into grooves 23 of holding and fixation elements 210 as with the embodiment as in FIGS. 1 and 2, and holding and fixation elements 210 are prestressed underneath by the weight of floor plates 11, so that their elastic force holds pipes 20 tightly and permanently in laminar contact against the bottom surfaces of floor plates 11. The sections of pipes 20 between rod-shaped holding and fixation elements 210 are held by an elastically flexible insulation material filler 29 in the double floor hollow space 24 in laminar heat-conductive contact with the bottom surfaces of floor plates 11. The elastic insulation material filling 29 is pressed by the weight of floor plates 11 during its use and in final state. For example, mineral wool can be used as insulation material filling 29. Insulation material filling 29 also forms a special heat insulation underneath. However, further installation lines or electrical cables and so forth (not shown) could be laid on the subfloor 13 beneath this insulation material filling 29.

What is claimed is:

1. In a double floor with framed floor plates of a heat conductive or heat storage material, the improvement comprising a system of pipes for carrying a heating or cooling medium, holding and fixation elements supporting said pipes, and upright bearings supporting the floor plates and also supporting said holding and fixation elements to maintain said system of pipes in heat-conductive contact with the bottom surfaces of the floor plates, said upright bearings having support plates movably mounted thereon for vertical adjustment, and said holding and fixation elements being mounted on said support plates, whereby the height of said holding and fixation elements can be adjusted to vary the force of contact of said pipes with the bottom surfaces of the floor plates.

2. A double floor as in claim 1, characterized in that pipes are held in a laminar contact with the floor plates.

3. A double floor as in claim 1, characterized in that said holding and fixation elements are provided with grooves for the pipes, are curved upwardly from their mounting positions against the bottom surfaces of the floor plates, and are formed of an elastically flexible material.

4. A double floor as in claim 3, characterized in that holding and fixation elements for the pipes are formed by plate-shaped structural elements of a heat-insulating material.

5. A double floor as in claim 1, characterized in that holding and fixation elements for the pipes are formed by plate-shaped structural elements of a heat-insulating material.

6. A double floor as in claim 4, characterized in that the tops of the plate-shaped holding and fixation elements are provided with a heat radiation reflecting sheet.

7. A double floor as in claim 3, characterized in that holding and fixation elements for the the pipes comprise bars, and the pipes between these bars are supported by an elastically flexible insulation material filling in the hollow space disposed beneath the double floor and against the floor plates, whereby the insulation material filler is packed by the weight of the floor plates.

8. A double floor as in claim 1, characterized in that holding and fixation elements for the pipes comprise bars, and the pipes between these bars are supported by an elastically flexible insulation material filling in the hollow space disposed beneath the double floor and against the floor plates, whereby the insulation material filler is packed by the weight of the floor plates.

9. A double floor as in claim 1, characterized in that the floor plates are sealed on their edges to hold back rising warm air.

10. A double floor as in claim 1, characterized in that the floor plates are formed of a mineral material in a metal vat-shaped outer armature.

11. A double floor as in claim 1, characterized in that said upright bearings further comprise vertically adjustable holding plates for supporting said floor plates.

12. A double floor as in claim 1, characterized in that said pipes are formed of a deformable material.

* * * * *